United States Patent
Betzler

(10) Patent No.: US 11,208,299 B2
(45) Date of Patent: Dec. 28, 2021

(54) SLING GEAR FOR SINGLE-ARM OPERATION BY A REMOTELY CONTROLLED GRIPPER, IN PARTICULAR OF A REMOTELY CONTROLLED VEHICLE

(71) Applicant: RUD KETTEN RIEGER & DIETZ GMBH U. CO. KG, Aalen (DE)

(72) Inventor: Michael Betzler, Abtsgmünd (DE)

(73) Assignee: RUD KETTEN RIEGER & DIETZ GMBH U. CO. KG, Aalen (DE)

( * ) Notice: Subject to any disclaimer, the term of this patent is extended or adjusted under 35 U.S.C. 154(b) by 333 days.

(21) Appl. No.: 16/324,948

(22) PCT Filed: Aug. 8, 2017

(86) PCT No.: PCT/EP2017/070076
§ 371 (c)(1),
(2) Date: Feb. 12, 2019

(87) PCT Pub. No.: WO2018/033435
PCT Pub. Date: Feb. 22, 2018

(65) Prior Publication Data
US 2021/0130137 A1    May 6, 2021

(30) Foreign Application Priority Data

Aug. 19, 2016  (DE) .......................... 102016215631.4

(51) Int. Cl.
*B66C 1/14*    (2006.01)
(52) U.S. Cl.
CPC ...................................... *B66C 1/14* (2013.01)
(58) Field of Classification Search
CPC ..................................... B66C 1/14; B66C 1/36
(Continued)

(56) References Cited

U.S. PATENT DOCUMENTS

| 621,295 | A | * | 3/1899 | Curtis |
| 1,546,208 | A | * | 7/1925 | Cunningham .......... E21B 19/04 294/82.2 |

(Continued)

FOREIGN PATENT DOCUMENTS

| GB | 910904 A | 11/1962 |
| JP | 2015-12914 A | 1/2015 |
| WO | 0225123 A1 | 3/2002 |

OTHER PUBLICATIONS

German Search Report for corresponding DE patent application No. 10 2016 215 631.4 from the German Patent and Trademark Office dated Feb. 21, 2019, 9 pages.

(Continued)

*Primary Examiner* — Paul T Chin
(74) *Attorney, Agent, or Firm* — Edell, Shapiro & Finnan, LLC

(57) ABSTRACT

A sling gear (1) for single-arm operation by a remotely controlled gripper may have a closure (4) that can be moved from a closed position (5) into an open position (82), a sling body (2) that is closed in the closed position (5) of the closure (4) and open in the open position (82), and an push-button (18) for opening the closure (4). The push-button (18) may have a gear section (68), which couples the closure (4) with the push-button (18), by transmitting movement. In order to improve the reliability in operation, also under adverse circumstances, for example in a heavily soiled environment on the seabed, the push-button (18) may be equipped with an locking area (56), which, in the closed position (5), is to be found engaged with the closure (4), and locks the closure (4) in the closed position (5).

14 Claims, 2 Drawing Sheets

Figure 2:
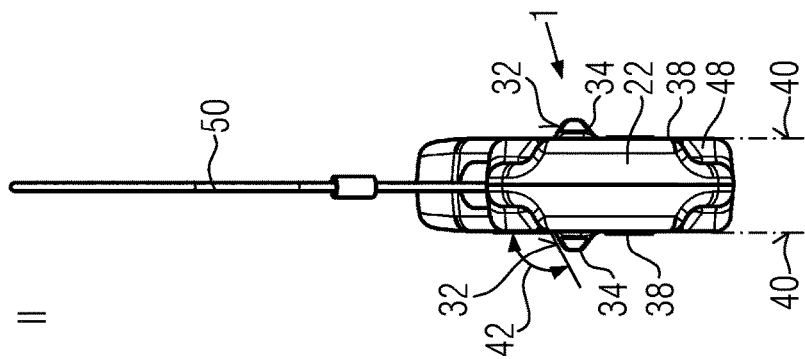

(58) Field of Classification Search
USPC .................................................. 294/75, 82.2
See application file for complete search history.

(56) References Cited

U.S. PATENT DOCUMENTS

| | | | | |
|---|---|---|---|---|
| 1,626,866 | A * | 5/1927 | Neilson .................... | E21B 19/04 294/82.2 |
| 1,790,056 | A * | 1/1931 | Moody .................... | E21B 19/04 294/82.2 |
| 2,116,880 | A | 5/1938 | Dee | |
| 2,197,997 | A | 4/1940 | Dee | |
| 3,341,244 | A * | 9/1967 | Johnson .................... | B66C 1/38 294/75 |
| 3,722,943 | A * | 3/1973 | Kalua, Jr. ................. | B66C 1/36 294/82.2 |
| 5,579,564 | A * | 12/1996 | Rullo ...................... | F16B 45/02 24/599.4 |
| 5,735,025 | A * | 4/1998 | Bailey ..................... | F16B 45/02 24/600.1 |
| 6,898,829 | B2 * | 5/2005 | Loe ........................ | F16B 45/02 24/599.5 |
| 8,015,676 | B1 * | 9/2011 | Choate .................... | F16B 45/02 24/599.5 |
| D842,079 | S * | 3/2019 | Betzler .................... | D8/356 |
| 2002/0162201 | A1 | 11/2002 | Liu | |

OTHER PUBLICATIONS

Office Action from Chinese patent application No. 201780048167.7 from the Chinese National Intellectual Property Administration (CNIPA), dated Feb. 6, 2020, 9 pages.

* cited by examiner

SLING GEAR FOR SINGLE-ARM OPERATION BY A REMOTELY CONTROLLED GRIPPER, IN PARTICULAR OF A REMOTELY CONTROLLED VEHICLE

The invention concerns a sling gear for single-arm operation by a remotely controlled gripper, in particular of a remotely controlled vehicle, with a closure that can be moved from a closed into an open position, a sling body that is closed by the closure in the closed position and open in the open position, and a push-button for opening the closure which contains a gear section, which couples the closure with the push-button, by transmitting movement.

A sling gear with these features is known from WO 02/25123 A1. This concerns a hook equipped with a closure (German: Schließe), which is supposed to be operated by a gripper of a remotely controlled submarine vehicle.

There is a risk, with this gripper, that the push-button for opening the closure and a release button located opposite will mutually block one another.

According to the invention, in order to avoid this, the sling gear mentioned at the beginning entails that the push-button contains a locking area, which engages, in the closed position, with the closure, and which locks the closure in the closed position.

As the locking area and the gear section are now located on a single component, namely the only push-button for opening the closure, a mutual block, as with the sling gear of WO 02/25123 A1, can no longer occur.

The invention can be further improved through the following further embodiments, which are each inherently advantageous on their own and can be combined with one another as desired.

Thus, according to a first advantageous embodiment, the push-button can be held on the sling gear movably from the closed position to the open position, and have a release position located between the closed and the open position. In the release position, the lock of the closure is preferably disengaged by the locking area, and the closure is still in the closed position. This measure ensures that the locking area of the sling gear cannot block the gear section. Because the lock is first of all disengaged by clearing the locking area in a first movement from the closed position into the release position, before, with the next movement of the release position, the closure being moved into the open position with the aid of the gear section. The gear section, when it is in the release position, preferably engages exactly with the closure, while, in the closed position of the push-button, it does not yet engage with the closure, so that no drive movement is transferred from the push-button to the closure prior to the lock being disengaged.

According to a further advantageous embodiment, the push-button may have an idle stroke, starting from the closed position, across which the closure remains in the closed position. At the end of the idle stroke, the locking area may be disengaged and/or the gear section brought into engagement with the closure. The idle stroke preferably serves the purpose of alternately bringing the gear section and the locking area of the push-button into engagement with the closure. At the end of the idle stroke, the push-button can be found in the release position.

Since, in contrast to WO 02/25123 A1, both the lock and the drive mechanism of the closure are united in a single push-button, in order to operate the gripper of the remotely controlled vehicle it is sufficient if the push-button is only placed on one side of the sling gear and accessible from the outside, respectively if it juts over one side of the sling gear. The push-button preferably juts out from a narrow side of the sling gear.

The sling gear preferably comprises a monolithically embodied base body, for example a forged one, which forms the sling body. The sling body may be designed in a hook shape.

In order to attach the sling gear to further lifting gear, sling gear or lashing systems, the base body may have a mounting opening, which is preferably provided at the end located opposite the sling body, wherein the push-button may be arranged between the sling eye and the mounting opening.

If the push-button can only be accessed with difficulty due to a position of the sling gear accidentally arising while it is in operation, it is advantageous if a second option for opening and closing the sling body is available. For this purpose, the push-button may, according to a further advantageous embodiment, be equipped on one side with a traction mechanism receptacle. The traction mechanism receptacle can be located on that side of the push-button which is located opposite the side protruding from the base body. In order that the traction mechanism receptacle is secured against damage, it may preferably be located within the base body in the open position as well as in the closed position of the push-button. The traction mechanism receptacle may, in a simple case, be a fork or boring, into which a traction mechanism, for example a rope or a towing rope fastened in the traction mechanism receptacle for opening the closure, which juts out from the side of the sling gear opposite the push-button and which can in particular be formed into a loop, can be inserted, and in which the traction mechanism can be anchored with tensile strength. By pulling on the traction mechanism, the closure is then opened, as when pressing the push-button. The pull on the traction mechanism will simply be transferred to the push-button via the traction mechanism receptacle.

The lock of the closure in the closed position can be effected by means of an locking surface in the locking area, which, in the closed position, abuts a counterface of the closure and blocks the movement of the closure into the open position. In the release position and/or open position, the locking surface and the counterface are preferably disengaged. In that respect, the locking surface preferably abuts the counterface, without any undercutting, in the direction of motion of the push-button from the closed into the open position. This makes it possible to disengage the lock of the closure using little force, because the locking surface can simply slid away from the counterface in the direction of motion of the push-button, from the closed into the open position. Only a minor degree of undercutting may, however, be desired, in order to lock the closure and push-button with each other in the closed position. The locking can only be overcome by exerting greater force, which protects the invention from incorrect operation.

The push-button can be held in the sling gear at one end, in such a way that it can be swivelled around a push-button axis. In order to transmit the greatest force possible to the closure, the locking area and the gear section are preferably located at the other end of the push-button.

Once a separate release button, as is used in WO 02/251123 A1, is omitted in the case of the sling gear in accordance with the invention, the side pointing away from the push-button can be used to improve the grabbing of the sling gear through the gripper of the remotely controlled vehicle. Thus, a gripping surface pointing away from the push-button may, for example, be widened at the side of the base body located opposite the push-button transversely to the direction of motion of the push-button. Thus, secure grabbing of the sling gear by the gripper is also possible at inconvenient angles.

The gripping surface can in particular have at least one wing protruding from a flat side of the base body, respectively transversely to the direction of motion of the push-button, the gripping surface may respectively be formed on at least one wing of a base body receiving the push-button, which wing protrudes transversely to the direction of motion of the push-button. Wings are preferably provided on both flat sides or on both sides of the sling gear extending transversely to the direction of motion of the push-button.

In a further embodiment, a base body receiving the push-button is provided on a recess with at least one thickened protective bulge revealing the push-button for operation.

In order to further simplify the grabbing of the sling gear at an inconvenient angle, the widened gripping surface may be inclined or run convex to the push-button outwards, in the direction away from the base body.

According to a further embodiment, the push-button may be located, at least in sections, in a particularly rectangular recess of the base body which reveals the push-button for operation. The recess is preferably provided on the side of the closure of the sling body.

In addition to the closure, which may be pre-stressed in the direction of the closed position, in particular by a leg spring, the push-button may also be pre-stressed by a closure spring. A leg spring may likewise be used as a closure spring.

The leg spring may, also in the release position of the push-button, continue to hold the closure in the closed position in any orientation of the sling gear, so that the closure can also not open under its own weight.

The push-button can be equipped with at least one flushing aperture, which extents through the push-button in or transverse to its direction of motion. The flushing aperture is exposed in at least one position, out of the closed position and the open position, so that it is always accessible from the outside. In particular in the case of an embodiment of the push-button as a flat body incorporated in a shaft of the base body, said at least one flushing aperture can extents through the flat sides of the push-button, which are located opposite the shaft walls. In the case of submarine uses or in a dusty environment, the flushing apertures prevent the push-button from getting stuck in the shaft.

The invention is explained in further detail below, based on an embodiment. For the sake of simplicity, when doing so the same reference signs will be used in the figures for elements which match one another in regard to the construction and/or function.

Figure 1:
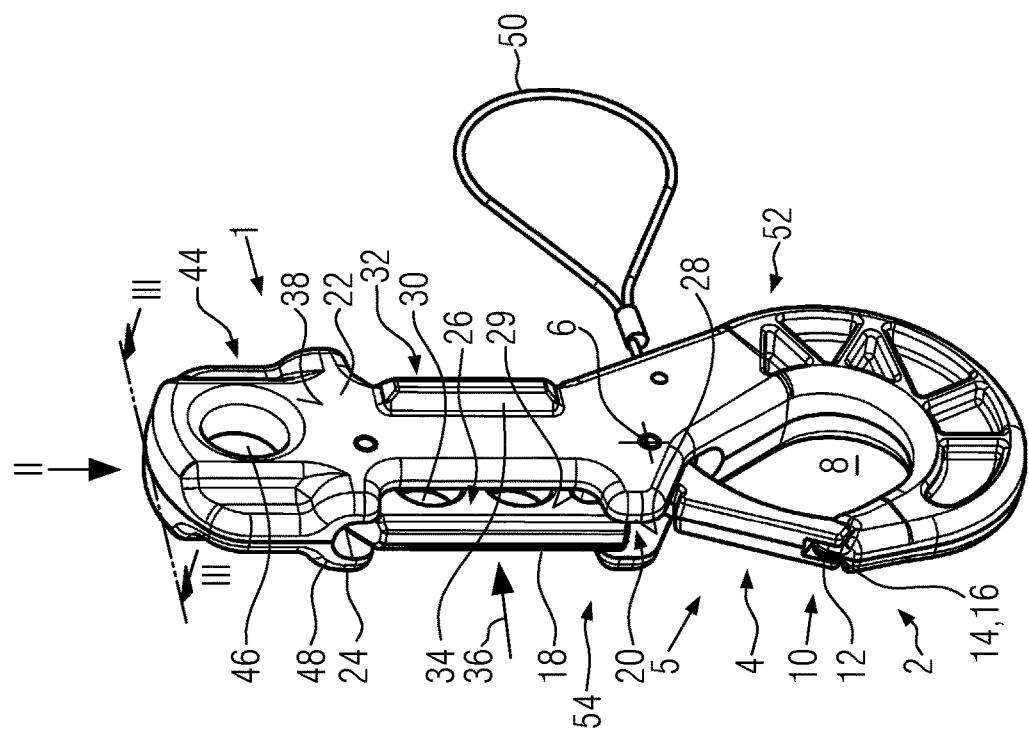
Figure 3:
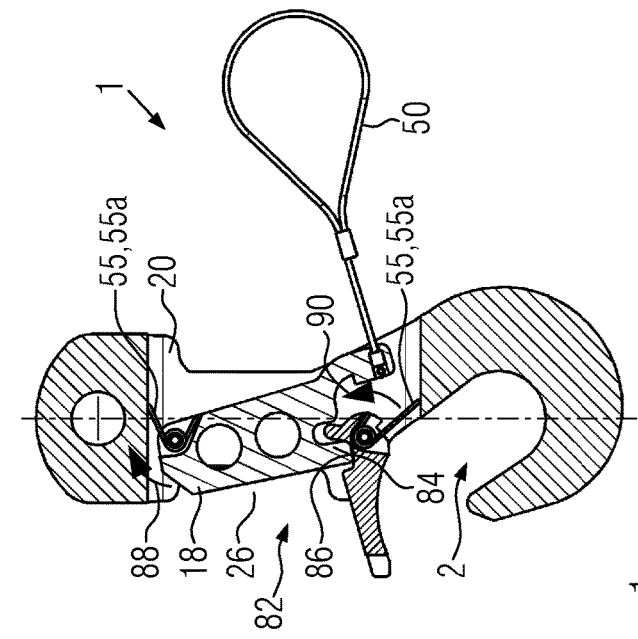
Figure 4:
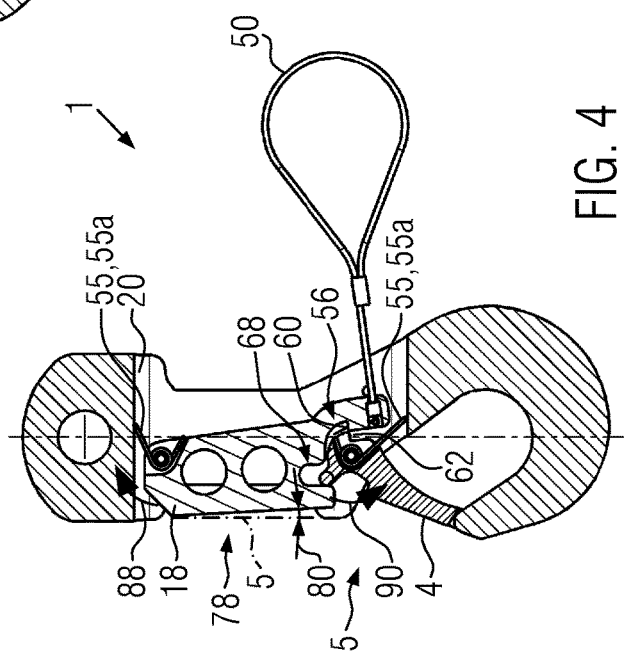
Figure 5:
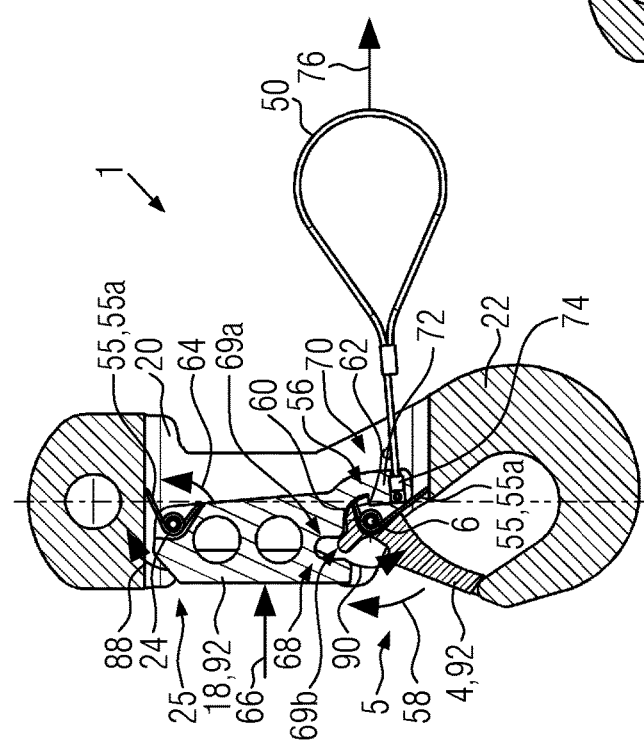

The figures show the following:

FIG. 1 a schematic perspective view of a sling gear designed in accordance with the invention;

FIG. 2 a schematic representation along the arrow II of FIG. 1;

FIG. 3 a schematic sectional representation along the III-III plane of FIG. 1 in a closed position of the sling gear;

FIG. 4 the sectional representation of FIG. 3 in a release position of the sling gear;

FIG. 5 the sectional representation of FIG. 4 in an open position of the sling gear.

First of all, the construction of a sling gear 1 designed in accordance with the invention is explained, by way of example, with reference to FIGS. 1 and 2. Merely in order to explain, the sling gear consists of a hook that can be operated by a gripper (not shown) of a remotely controlled submarine vehicle (not shown) without any further aids.

The sling gear 1 has a sling body 2, which, in this case, is hook-shaped. The sling body 2 is closed by a moveable closure 4, if the closure 4 is in the closed position 5 of the sling gear shown in FIG. 1.

The closure can be swivelled around a closure axis 6, preferably on a plane 8 of the sling body 2 between an open position, not shown in FIG. 1, and the closed position 5 shown in FIG. 1, wherein the closure 4 is swivelled away from the sling body 2 in the open position. At the end 10 facing away from the closure axis 6, the closure 4 can be equipped with at least one form-fit element 12, which engages with a form-fit element 14 of the sling body 2 designed to complement it, securing the end 10 crosswise to the plane of movement 8 of the closure 4. For example, the end 10 can be designed in a bifurcate manner, and, in the closed position 5, receive a securing protrusion 16 of the sling body 2.

An push-button 18, which is incorporated into a shaft 20 of a base body 22 of the sling gear 1, monolithically forming the sling body 2, is provided for opening the closure 4. If no forces impact upon it from outside the sling gear 1, the push-button 18 is to be found in the closed position. It is moved into an open position by pressure, and thereby drives the movement of the closure 4 into the open position, as explained in detail with reference to FIGS. 3 to 5. The push-button may be supported in a manner permitting it to be swivelled around an push-button axis 24 on the base body 22. The push-button axis 24 is preferably provided for at the end 25 of the push-button 18 facing away from the sling body 2. Instead of a swivellable push-button 18, a sliding button can also be used in the shaft 20, without any differences in the mode of operation described below resulting therefrom.

In order to be easily accessible from outside by means of a gripper and be protected at once, the push-button can be provided for in a recess 26 of the base body 22. The recess 26 may, as shown in FIG. 1, be rectangular.

The push-button 18 is preferably a flat body, the flat sides 29 of which face towards the walls 28 of the shaft 20. In order to avoid the push-button 18 getting stuck, at least one flushing aperture 30 may exist, which pushes through the flat sides 29 of the push-button 18, and is always, at least partially, accessible from outside the sling gear.

A widened gripping surface 32 may be provided on the sling gear 1, opposite the push-button 18, which, when the push-button 18 is operated using a gripper, forms an abutment. The gripping surface 32 may have at least one wing 34, which protrudes crosswise to the direction of motion and/or operation 36 of the push-button 18 and/or a flat side 38 of the base body 22. There is preferably always at least one wing provided for on both flat sides 38 of the base body 22. The gripping surfaces 32 are inclined in the direction leading away from the flat sides 38, back towards the push-button, so that they form an outwardly directed obtuse angle 42 with the planes 40 spread out from the flat sides 38. The recoiling of the gripping surfaces 32 enables them to be gripped by a gripper, also at inconvenient angles, for example at a slant from the side.

The sling gear 1 is, moreover, equipped with a fastening section 44, which may comprise a mounting eye 46 or a fastener designed in another way. With the aid of the fastening section 44, the sling gear 1 can be attached to further lifting gear, sling gear or lashing systems, for example a rope or a chain. The push-button 18 is provided for, in the embodiment shown, merely by way of example, in FIG. 1, between the sling body 2 and the fastening section 44. The gripping surface 32 recoils somewhat in the direction of the push-button in relation to the fastening section 44. In the area of the push-button 18, the base body 22 is therefore constricted.

At least one end or edge of the recess 26, at least one protective bulge 48 is provided for, which projects crosswise to the direction of operation 36 or the plane 8 of the sling body 2 and forms a bulge protecting the push-button 18.

Finally, the sling gear 1 may comprise a traction mechanism 50, which is hung in the push-button 18. The traction mechanism 50 serves to additionally operate the closure 4. The traction mechanism 50 projects from the side 52 of the sling gear 1 located opposite the push-button 18. By pulling on the traction mechanism 50, the push-button 18 is moved in exactly the same way as by exerting pressure on the other side 54. The traction mechanism may, for example, be a towing rope, in particular a steel cable with a loop.

It cannot be seen in FIGS. 1 and 2 that the closure 4 and/or the push-button 18 are pre-stressed by a closure spring in the direction of the closed position 5 (cf. FIGS. 3-5).

Next the function of the push-button 18 is described with reference to FIGS. 3 to 5.

It is shown in FIG. 3 that the push-button 18 is pre-stressed by means of a closure spring 55 around the push-button axis 24 along a clockwise direction 88 shown in FIG. 3.

The closure 4 is also pre-stressed by means of a closure spring 55 around the closure axis 6 along an anti-clockwise direction 90 shown in FIG. 3.

The closure spring 55 of the closure 4 and the push-button 18 are each designed as a leg spring 55a.

In FIG. 3, the closure 4 and the push-button 18 are each shown in an end position 92, in which the closure 4 and the push-button 18 are swivelled by the respective closure spring 55, as long as no actuation pressure 66 or pull 76 is exerted on the push-button 18.

FIG. 3 shows the sling gear 1 in the closed position 5, in which the push-button 18 and the closure 4 are to be found in their respective resting positions, where no force is exerted upon them from outside the sling gear 1. The closure 4 is locked in the closed position 5. It cannot be moved directly, but only indirectly, by pressing the push-button.

A locking area 56 of the push-button 18 is to be found engaged with the closure 4, and blocks its swivelling motion 58 around the closure axis 6. The locking area 56 has an locking surface 60, which is always pressed against the complementary counterface 62 of the closure under the influence of a closure spring 55 pre-stressing the push-button 18 into the closed position 5 and the closure 4 into the closed position 5. In other embodiments of the sling gear 1, only the closure 4, or also only the push-button 18, may be pre-stressed with a closure spring 55.

The locking surface 60 and the counterface 62 abut one another in regard to a direction of motion 64 of the push-button 18 around the push-button axis 24 without undercutting one another, or, at the most, while undercutting one another only slightly. Should the push-button be moved from the closed position 5 by the actuation pressure 66, the surfaces 60 and 62 may slide away from one another.

The push-button 18 is, in addition, equipped with a gear section 68, which can be brought to engage with the closure 4, by transmitting movement. In the closed position 5, the gear section 68 is preferably to be found disengaged from the closure. The gear section 68 may, for example, interlock with the closure 4, and thus couple the movement of the push-button 18 with the movement of the closure 4 then running in the opposite direction due to the pressure 66. The gearing 69a of the push-button 18 is allocated a corresponding complementary gearing 69b of the closure 4.

While the locking area 56 statically holds the closure 4 in the closed position 5, protecting it against external impact, the gear section 68 serves the purpose of dynamically transmitting movement from the push-button 18 to the closure 4.

The locking area 56 and the gear section 68 can, as shown in FIG. 3, be found at the other end 70 of the push-button 18 in relation to the push-button axis 24. The locking area can in particular be found on an extension 72 of the push-button extending away from the axis, which may additionally form a traction mechanism receptacle 74 for the traction mechanism 50. The traction mechanism receptacle 74 may be placed at the end 70, so that the locking area 56 extends between the traction mechanism receptacle 74 and the push-button axis 24. The gear section 68 may, in turn, be provided between the locking area 70 and the push-button axis 24.

By pulling 76 on the traction mechanism 50, the push-button 18 is indirectly moved in exactly the same way as it is moved directly by exerting actuation pressure 66 on the button. The traction mechanism 50 is thus an alternative means of actuation.

If the push-button 18 is pressed, or if the traction mechanism 50 is pulled, the locking area 56 is first of all disengaged from the closure 4, and the lock in the closed position 5 is disengaged. This is shown in FIG. 4: The sling gear 1 is to be found in a release position 78, in which the lock of the closure is disengaged, however the closure 4 is still to be found in the closed position. The gear section 68 precisely engages with the closure, so that the movement of the push-button 18 is precisely transmitted to the closure 4. The locking surface 60 and the counterface 62 have precisely fully disengaged.

The actuation pressure 66 or the pull 76 is exerted against the force exerted by the closure spring 55 of the push-button 18, so that the closure spring 55 is stressed.

During the movement from the closed position 5 (drawn in with a dotted line in FIG. 4) into the release position 78, the push-button 18 executes an idle stroke 80, during which the closure 4 is not moved.

If the push-button 18 continues to be pressed or the traction mechanism 50 continues to be pulled, the movement of the push-button 18 is transmitted to the closure 4, which is thereby, against the spring tension of the corresponding closure spring 55, moved away from the closed position 5 until the sling gear 1 is located in the open position 82 shown in FIG. 5, in which the sling body 2 is open. In the open position 82, a stop surface 84 on the push-button side abuts a stop surface 86 on the closure side, and prevents any further movement of the closure 4 and the push-button 18. In the open position 82, the push-button still always preferably protrudes from the sling gear 1 or the recess 26 over its entire length accessible from the outside in the open position. Thus, the entire movement of the push-button 18 from the closed position 5 into the open position 82 may be effected from the outside under the actuation pressure 66 of a single gripper.

So that the closed position 5 is resumed, the push-button 18 or the traction mechanism 50 is simply released. Under the impact of said at least one closure spring 55 pre-tensioning the push-button 18 and/or the closure 4, the push-button 18 and the closure 4 return to the closed position via the release position 78.

REFERENCE SIGNS

1 Sling gear
2 Sling body
4 Closure
5 Closed position
6 Closure axis
8 Plane
10 End of the closure facing away from the closure axis
12 Form-fit element of the closure
14 Form-fit element of the sling body
16 Securing protrusion
18 Push-button
20 Shaft
22 Base body
24 Push-button axis
25 The end of the push-button facing away from the sling body
26 Recess in the base body
28 Shaft wall
29 Flat side of the push-button
30 Flushing aperture of the push-button
32 Gripping surface of the base body
34 Wing of the base body
36 Direction of operation of the push-button
38 Flat side of the base body or sling gear
40 Plane of the flat side
42 Angle between the gripping surface and the flat side
44 Fastening section of the sling gear
46 Mounting eye
48 Protective bulge
50 Traction mechanism
52 The side of the sling gear located opposite the push-button
54 Side of the push-button
55 Closure spring
55a Leg spring
56 Locking area
58 Swivelling motion of the closure
60 Locking surface of the push-button
62 Counterface of the closure
64 Direction of motion of the push-button
66 Actuation pressure on the push-button
66 Gear section of the push-button
69a Gearing of the gear section
69b Gearing of the closure
70 The end of the push-button facing away from the push-button axis
72 Extension of the push-button
74 Traction mechanism receptacle
76 Pull on the traction mechanism
78 Release position
80 Idle stroke
82 Open position
84 Stop surface
86 Stop surface
88 Clockwise direction
90 Anti-clockwise direction
92 End position

The invention claimed is:

1. A sling gear (1) for single-arm operation by a remotely controlled gripper, the sling gear (1) comprising: a closure (4) that can be moved from a closed position (5) into an open position (82), a sling body (2) that is closed by the closure (4) in the closed position (5) and open in the open position (82), and a push-button (18) for opening the closure (4), the push-button (18) containing a gear section (68) that couples the closure (4) with the push-button (18) by transmitting movement, wherein the push-button (18) has a locking area (56) that engages with the closure (4) in the closed position (5) and locks the closure (4) in the closed position, and wherein the push-button (18) protrudes on a first side (54) of the sling gear (1) from a base body (22) of the sling gear (1), and is equipped on a second side (52) of the sling gear (1) with a traction mechanism receptacle (74) for attaching a traction mechanism (50).

2. The sling gear (1) according to claim 1, wherein the push-button (18) is held in the sling gear (1) movably from the closed position (5) into the open position (82) and has a release position (78) between the closed position (5) and the open position (82), in which the locking of the closure (4) is released by the locking area (56) and in which the closure (4) is in the closed position (5).

3. The sling gear (1) according to claim 1 or 2, wherein the push-button (18) further comprises an idle stroke (80) starting from its closed position (5), and across which the closure (4) remains in the closed position (5).

4. The sling gear (1) according to claim 3, wherein the gear section (68) engages with the closure (4) at an end of the idle stroke (80).

5. The sling gear (1) according to claim 1, wherein the traction mechanism (50) for opening the closure (40) is fastened in the traction mechanism receptacle (74) such that the traction mechanism (50) juts out from the second side (52) of the sling gear (1) that is located opposite of the push-button (18).

6. The sling gear (1) according to claim 1, wherein the locking area (56) has an adjoining locking surface (60), which, in the closed position (5) and in a direction of motion (64) of the push-button (18) from the closed position (5) to the open position (82), abuts a counterface (62) of the closure (4) free of undercuts.

7. The sling gear (1) according to claim 1, wherein the push-button (18) is held in the sling gear (1) at a first end (25) of the push-button (18) in such a way that the push-button (18) swivels around a push-button axis (24), and the locking area (56) and the gear section (68) are located at a second end (70) of the push-button (18).

8. The sling gear (1) according to claim 1, wherein the gear section (68) is disengaged from the closure (4) in the closed position (5).

9. The sling gear (1) according to claim 1, wherein a gripping surface (32) pointing away from the push-button (18) is widened at the second side (52) of the sling gear (1) that is located opposite the push-button (18) and transversely to a direction of motion (64) of the push-button (18).

10. The sling gear (1) according to claim 9, wherein the gripping surface (32) is formed on at least one wing (34) of the base body (22) receiving the push-button (18), the at least one wing (34) protrudes transversely to a direction of motion (64) of the push-button (18).

11. The sling gear (1) according to claim 1, wherein the base body (22) receiving the push-button (18) is equipped, at a recess (26) revealing the push-button (18) for operation, with at least one thickened protective bulge (48).

12. The sling gear (1) according to claim 1, wherein the closure (4) is pre-stressed in a direction of the closed position (5).

13. A sling gear (1) for single-arm operation by a remotely controlled gripper, the sling gear (1) comprising: a closure (4) that can be moved from a closed position (5) into an open position (82), a sling body (2) that is closed by the closure (4) in the closed position (5) and open in the open position (82), a push-button (18) for opening the closure (4), the push-button (18) containing a gear section (68) that couples the closure (4) with the push-button (18) by transmitting movement, and a base body (22) receiving the push-button (18), wherein the push-button (18) has a locking area (56) that engages with the closure (4) in the closed position (5) and locks the closure (4) in the closed position, and wherein the base body (22) is equipped, at a recess (26) revealing the push-button (18) for operation, with at least one thickened protective bulge (48).

14. A sling gear (1) for single-arm operation by a remotely controlled gripper, the sling gear (1) comprising: a closure (4) that can be moved from a closed position (5) into an open position (82), a sling body (2) that is closed by the closure (4) in the closed position (5) and open in the open position (82), and a push-button (18) for opening the closure (4), the push-button (18) containing a gear section (68) that couples the closure (4) with the push-button (18) by transmitting movement, wherein the push-button (18) has a locking area (56) that engages with the closure (4) in the closed position (5) and locks the closure (4) in the closed position, and wherein the closure (4) is pre-stressed in a direction of the closed position (5) by a leg spring (55*a*).

\* \* \* \* \*